US008888545B2

(12) United States Patent
Rossini

(10) Patent No.: US 8,888,545 B2
(45) Date of Patent: Nov. 18, 2014

(54) FLOAT ATTACHMENT DEVICE FOR PROVIDING BUOYANCY TO OBJECTS

(76) Inventor: William Thomas Rossini, Kings Mountain, NC (US)

(*) Notice: Subject to any disclaimer, the term of this patent is extended or adjusted under 35 U.S.C. 154(b) by 168 days.

(21) Appl. No.: 13/417,908

(22) Filed: Mar. 12, 2012

(65) Prior Publication Data

US 2012/0315813 A1   Dec. 13, 2012

Related U.S. Application Data

(60) Provisional application No. 61/464,910, filed on Mar. 11, 2011.

(51) Int. Cl.
| | |
|---|---|
| *B63B 22/00* | (2006.01) |
| *B63B 35/79* | (2006.01) |
| *G03B 29/00* | (2006.01) |
| *G03B 17/08* | (2006.01) |
| *G03B 17/56* | (2006.01) |

(52) U.S. Cl.
CPC ............ *B63B 22/00* (2013.01); *B63B 35/7933* (2013.01); *G03B 29/00* (2013.01); *G03B 17/08* (2013.01); *G03B 17/561* (2013.01); *G03B 17/563* (2013.01); *G03B 17/568* (2013.01)
USPC .................................. 441/1; 441/6

(58) Field of Classification Search
USPC .............................................. 441/1, 6, 23, 75
IPC .......................................................... B63B 22/00
See application file for complete search history.

(56) References Cited

U.S. PATENT DOCUMENTS

| | | | | |
|---|---|---|---|---|
| 3,610,192 | A | * | 10/1971 | Mauritzen ........................ 114/45 |
| 4,713,031 | A | * | 12/1987 | Fuller .................................. 441/8 |
| 5,779,510 | A | * | 7/1998 | Skedelski ......................... 441/75 |
| 5,839,931 | A | * | 11/1998 | Shieh ................................. 441/6 |
| 2003/0139103 | A1 | * | 7/2003 | Charte ............................. 441/23 |
| 2008/0078788 | A1 | * | 4/2008 | Degges et al. .............. 224/148.1 |
| 2009/0093177 | A1 | * | 4/2009 | Reed ............................... 441/23 |

* cited by examiner

*Primary Examiner* — Stephen Avila
(74) *Attorney, Agent, or Firm* — Tillman Wright, PLLC; James D. Wright

(57) ABSTRACT

A float attachment device for providing buoyancy to a waterproof camera or other object of interest includes a buoyant body, adapted to be fastened directly to a housing of the object of interest, and a lanyard adapted to be connected at a first end to the buoyant body and at a second end to a surfboard or other anchor body. An attachment layer, such as double-sided tape, can be used to fasten the buoyant body to the object of interest. The lanyard may include two separable but reconnectable tether line sections. The buoyant body can be made from closed cell flotation foam with a flexible vinyl coating.

12 Claims, 6 Drawing Sheets

FLOAT ATTACHMENT DEVICE FOR PROVIDING BUOYANCY TO OBJECTS

CROSS-REFERENCE TO RELATED APPLICATION

This application is entitled to the benefit of, and claims priority to, provisional U.S. Patent Application Ser. No. 61/494,910 filed Mar. 11, 2011 and entitled "FLOAT ATTACHMENT FOR SECURING, PROTECTING AND SUPPORTING OBJECTS USED ABOVE, BELOW AND IMMERSED IN WATER," the entirety of which is incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

The present invention relates generally to flotation devices, and, in particular, to a float attachment device for helping waterproof cameras and other objects of interest afloat when dropped or placed in the water.

2. Background

People participate in a wide variety of watersports, with more seemingly being created all the time. Such sports include surfing, stand up paddling, rafting, kayaking, wake boarding, water skiing, snorkeling, kite boarding, canoeing, parasailing, diving.

Although in many cases the user is only interested in the activity itself, sometimes the user carries out auxiliary activities as well. In particular, "point-of-view" camera use has become popular, wherein a camera is mounted on the user or on his or equipment and directed to capture images of the user, his surroundings, or both while engaging in his activity. Waterproof point and shoot cameras, waterproof phones, and watertight cases for cameras are also commonly available. Popular cameras for use in or around water are available from Woodman Labs, Inc. (marketed under the name Go Pro®), Sony (marketed under the name Cybershot), and Olympus (marketed under the name of Tough). Third party cases available for use with cameras or camera-equipped devices like iPhones include the Aqua Box, Otterbox, and Lifeproof. Unfortunately, many people end up losing their cameras in the water when the mounts break or, if the camera is hand-carried, when the people lose their grip while trying to hold and shoot pictures or video in water. Moreover, when they lose their cameras, the cameras frequently sink, because they are not usually designed to be buoyant enough themselves to stay afloat. In other words, although there are many cameras designed for use in the water, cameras like the Go Pro® line and others are enclosed in a watertight housing, but do not float.

Thus, a need exists for a simple float attachment device that may be mounted on a waterproof camera or other object of interest in order to keep it afloat when it is dropped or placed in the water.

SUMMARY OF THE PRESENT INVENTION

The present invention comprises a float attachment device for providing buoyancy to a waterproof camera or other object of interest.

Broadly defined, the present invention according to one aspect is a float attachment device, including: a buoyant body adapted to be fastened directly to a housing of the waterproof camera; and a lanyard adapted to be connected at a first end to the buoyant body and at a second end to a surfboard.

In a feature of this aspect, the buoyant body is fastened to the housing of the waterproof camera via double-sided tape.

In another feature of this aspect, the lanyard includes a first section of tether line and a second section of tether line, the first section is connected to the buoyant body and the second section is connected to the surfboard, and the first section may be connected and disconnected from the second section without removing the first section from the buoyant body or the second section from the surfboard, thereby allowing the buoyant body to be temporarily removed from the presence of the surfboard.

In another feature of this aspect, the buoyant body is a block of closed cell flotation foam. In a further feature, the block of closed cell flotation foam has a first dimension between 1.0 and 4.0 inches, a second dimension between 1.0 and 3.0 inches, and a third dimension between 0.5 and 1.5 inches.

In another feature of this aspect, the buoyant body has a flexible vinyl coating.

Broadly defined, the present invention according to another aspect is a float attachment device for providing buoyancy to an object of interest, including: a buoyant body affixed to a non-buoyant object of interest; and a lanyard adapted to be connected at a first end to the buoyant body and at a second end to an anchor body.

In a feature of this aspect, the buoyant body is adhered to the non-buoyant object of interest.

In a further feature of this aspect, the buoyant body is comprised of flotation foam. In still further features, the flotation foam is closed cell flotation foam; the flotation foam is covered by a flexible vinyl coating; and/or the dimensions of the flotation foam are selected to correspond to the dimensions of the object of interest.

In a further feature of this aspect, the lanyard includes a first section of tether line and a second section of tether line, wherein the first section is connected to the buoyant body and the second section is connected to the anchor body, and wherein the first section may be connected and disconnected from the second section without removing the first section from the buoyant body or the second section from the anchor body, thereby allowing the buoyant body to be temporarily removed from the presence of the anchor body.

In a further feature of this aspect, the buoyant body includes a hole penetrating therethrough, and the lanyard is routed through the opening to couple the lanyard to the buoyant body.

In a further feature of this aspect, the lanyard is clipped to the buoyant body.

In a further feature of this aspect, the object of interest is a camera. In a still further feature, the block of closed cell flotation foam has a first dimension between 1.0 and 4.0 inches, a second dimension between 1.0 and 3.0 inches, and a third dimension between 0.5 and 1.5 inches.

In a further feature of this aspect, the buoyant body has a buoyancy sufficient to support at least the weight of the object of interest. In a still further feature, the buoyant body has a buoyancy sufficient to support at least three times the weight of the object of interest.

Broadly defined, the present invention according to another aspect is a float attachment device for providing buoyancy to an object of interest, including: a buoyant body; an attachment layer adapted to fasten the buoyant body directly to a non-buoyant object of interest; and a lanyard connected at a first end to the buoyant body and adapted to be connected at a second end to an anchor body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
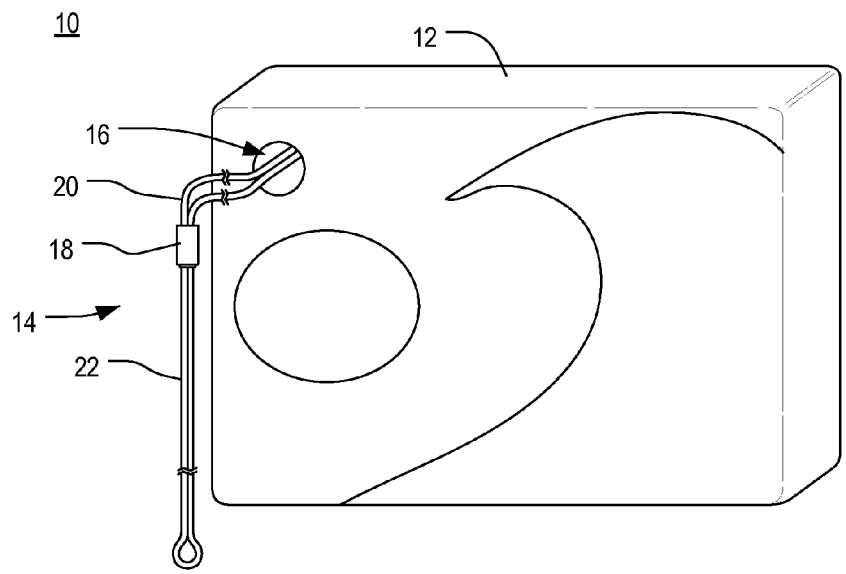
FIG. 1 is a front perspective view of a float attachment device for objects in water in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiments is merely exemplary in nature and is in no way intended to limit the invention, its implementations, or uses.

Figure 2:
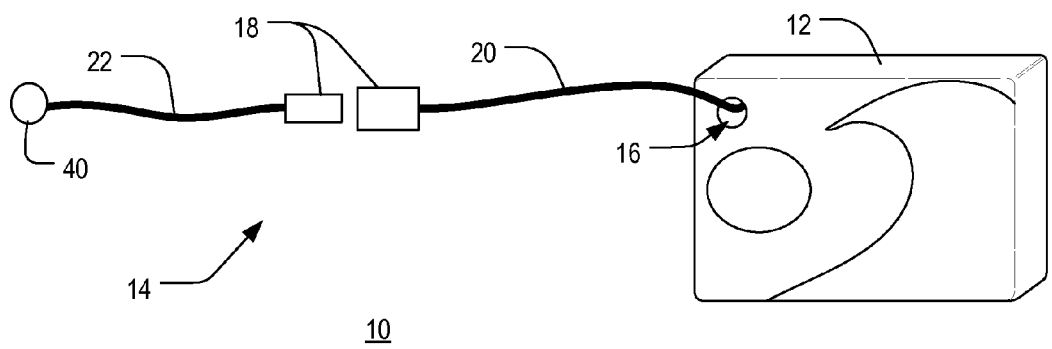
FIG. 2 is a schematic view of the float attachment device of FIG. 1, illustrating operation of the detachable lanyard.

FIG. 1 is a front perspective view of a float attachment device 10 for objects in water in accordance with one or more preferred embodiments of the present invention, and FIG. 2 is a schematic view of the float attachment device 10 of FIG. 1, illustrating operation of the detachable lanyard 14. As shown therein, the float attachment device 10 includes a buoyant body 12 and a lanyard 14. The buoyant body 12 may be any object or assembly that provides some measure of buoyancy for another object 30 that is typically non-floating or only semi-floating. As used herein, a "buoyant body" is any body that tends to float or rise when submerged in water. The shape, size, material, and other properties of the buoyant body 12 are preferably selected such that the buoyant body 12 is capable of keeping an object of interest 30 afloat when the object of interest 30 is placed or falls into a body of water. This, in turn, is based on the shape, size, weight, relative buoyancy and other properties of the object of interest 30. Cost may also be factor, both of the buoyant body 12 itself as well as the object of interest 30. The buoyancy of the buoyant body 12 selected is preferably sufficient to float at least the weight of the object of interest 30, and preferably sufficient to float an object having at least two (and more preferably, three) times the weight of the object of interest 30. In at least some embodiments, the buoyant body 12 is a single body of closed cell flotation foam. However, in other embodiments, multiple pieces of such foam may be utilized, other materials may be utilized, and the like. Materials that may suitable for use in one or more embodiments of the present invention include ethylene vinyl acetate (EVA) Foam, closed cell foam, plastic, rubber, styrofoam, urethane foam, polyethylene foam, neoprene foam, FloTex foam, and the like.

In at least some embodiments, the buoyant body 12 is made from foam dipped in a flexible vinyl coating. One purpose of such coating is to allow for graphic or logo screening. Further, in some embodiments the buoyant body 12 is impregnably watertight.

The lanyard 14 is attached at one end to the buoyant body 12 and at the other end to an anchor body 40. As used herein, an "anchor body" is any body that is generally solid, stable, reliable, or the like, relative to the buoyant body 12 and the object of interest 30, and which will retain the buoyant body 12, via the lanyard 14, when the buoyant body 12 is floating in water. The anchor body 40 may be, for example, a surfboard, boogie board, body board, or the like; jet ski, Wave Runner®, or other personal watercraft; sailboard; water ski; tube; canoe, kayak, or other boat; or the like; or even the wrist, ankle or other body part of a user. The tether line of the lanyard 14 may be made from any strong, flexible material but is preferably adapted to withstand repeated use in the water, is further preferably adapted to withstand repeated cycles of water immersion and subsequent drying, and is still further preferably adapted for use in fresh or salt water. In at least some embodiments, the tether line is made of nylon rope or string, but other materials may likewise be utilized, including silk, cotton, rubber, or plastic line, rope, or string, and metal or plastic chain link.

In at least some embodiments, the lanyard 14 further includes two sections 20,22 that may be connected and disconnected easily via a clip or similar device or mechanism 18. Devices or mechanisms that may be suitable for use in one or more preferred embodiments of the present invention include plastic lanyard clips, locking clips, hook and loop sections (such as Velcro®), permanent clips, cord locks, clasps, buckles, break away buckles, and the like. The clip 18 allows one section 22 to be permanently or semi-permanently attached to the anchor object 40 and the other section 20 to be permanently or semi-permanently attached to the buoyant body 12, but permits the two sections 20,22 to be easily separated if it is desired to temporarily separate the buoyant body 12 from the anchor body 40.

In at least some embodiments, a hole 16 penetrates the buoyant body 12, and the lanyard 14 is semi-permanently attached to the buoyant body 12 by routing the tether line through the hole. The size of the hole 16 is selected to accommodate this. One hole size suitable for use in at least some of these embodiments is one with a ¼ inch diameter.

In at least some embodiments, a clip is attached at one or the other of the ends of the lanyard 14 or both ends to facilitate removably attaching a first end of the lanyard 14 to the buoyant body 12, a second end of the lanyard 14 to the object of interest 30, or both.

Figure 3:
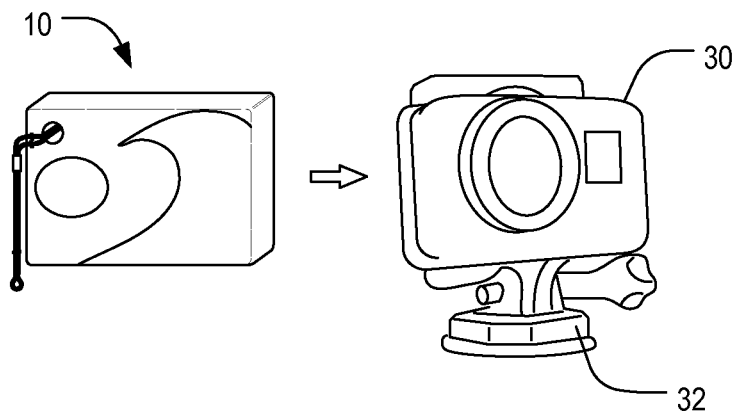
FIG. 3 depicts the use of the float attachment device of FIG. 1 with a waterproof camera.

In at least some preferred embodiments, the float attachment device 10, including the buoyant body 12, is adapted for use with a waterproof still camera, video camera, or other electronic device 30. FIG. 3 depicts the use of the float attachment device 10 of FIG. 1 with a waterproof camera 30. It will be appreciated that the camera or other electronic device 30 does not have to be waterproof, but it is expected that watersports enthusiasts using electronic equipment are much more likely to use devices that are at least partly waterproofed. The buoyant body 12 thus may have a size approximating that of the camera or camera housing 30. In particular, waterproof cameras are not typically waterproof themselves but are instead enclosed in a watertight housing. Furthermore, neither the camera nor the housing is itself conventionally buoyant in nature, and thus tends to sink when dropped or placed in the water. The buoyant body 12 is thus preferably adapted to provide buoyancy not only for itself, but for the camera and its watertight housing. One construction of the buoyant body 12 that has been found to be suitable is a single piece of closed cell flotation foam that is about two and $^{11}/_{16}$ inches wide, about one and ⅞ inches tall, and about ¾ inch thick, but in general, the buoyant body is preferably between one and four inches wide, between one and three inches tall, and between 0.5 and 1.5 inches thick.

Figure 4:
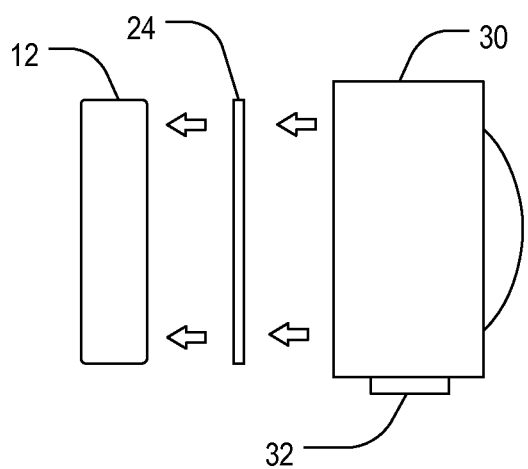
FIG. 4 is a side schematic view of the buoyant body of FIG. 3 being mounted to the camera.
Figure 5:
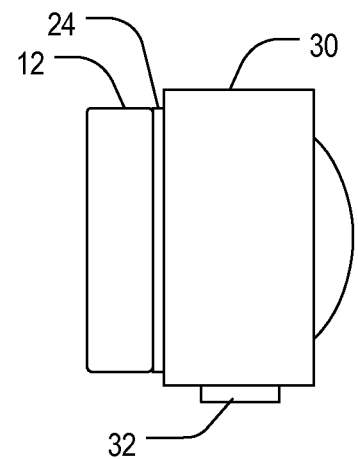
FIG. 5 is a side schematic view of the buoyant body of FIG. 3 after mounting it to the camera.

FIG. 4 is a side schematic view of the buoyant body 12 of FIG. 3 being mounted to the camera 30. In at least some embodiments, the buoyant body 12 may be reliably attached to the camera housing 30 without special tools and without damaging the integrity of the housing. One means that has been found suitable for providing such attachment is the use of double-sided tape 24, one or more pieces of which may be placed between the buoyant body 12 and the back of the camera housing 30, as shown in FIG. 3. One type of double-stick tape that has been found suitable is Very High Bond VHB double-stick tape, available from 3M. FIG. 5 is a side schematic view of the buoyant body 12 of FIG. 3 after mounting it to the camera 30 using the double-stick tape 24. It will be appreciated, however, that other non-intrusive means may likewise be utilized, including glues, cements and other bonding agents, or that in some cases screws or the like may be utilized to fasten the buoyant body 12 to the housing 30. In the latter case, it may be necessary to take additional steps to ensure that the housing remains watertight.

Figure 6:
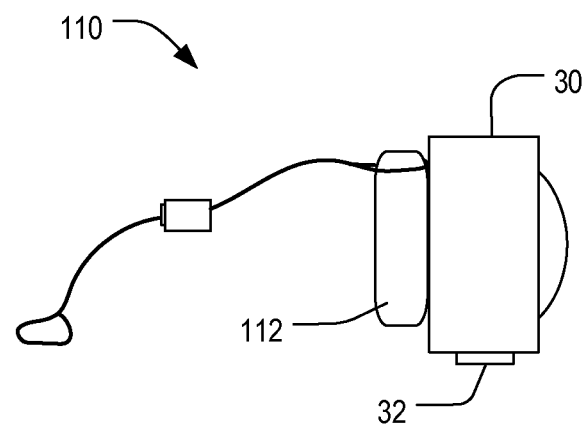
FIG. 6 is a side schematic view of an alternative float attachment device mounted to a camera in accordance with one or more preferred embodiments of the present invention.

In FIGS. 1-5, the buoyant body 12 is shown as having a generally rectilinear shape with slightly rounded or beveled edges. FIG. 6 is a side schematic view of an alternative float attachment device 110 mounted to a camera 30 in accordance with one or more preferred embodiments of the present invention. In FIG. 6, the buoyant body 112 may have a much more rounded or even somewhat flexible surface or contour, such as may be provided by an inflatable body. The buoyant body 112 in FIG. 6 is also shown as being mounted directly to the body of the camera housing 30 without use of double-sided tape.

Figure 7:
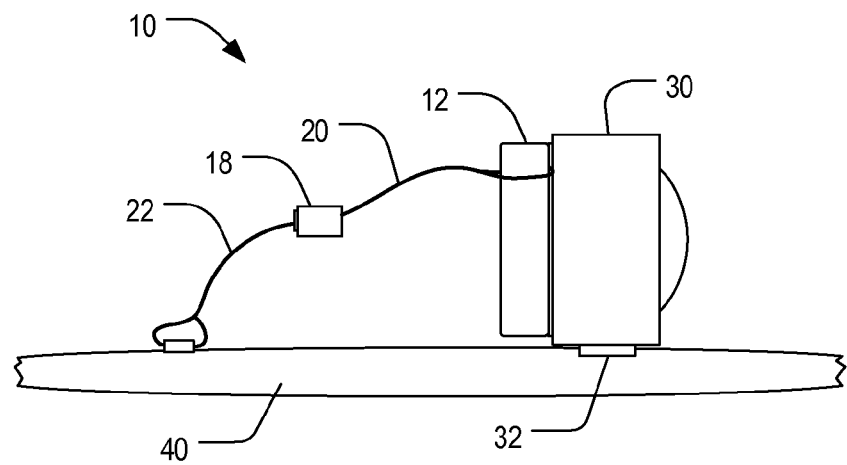
FIG. 7 is a fragmentary side schematic view of the camera and float attachment device of FIG. 3 attached to a surfboard.
Figure 8:
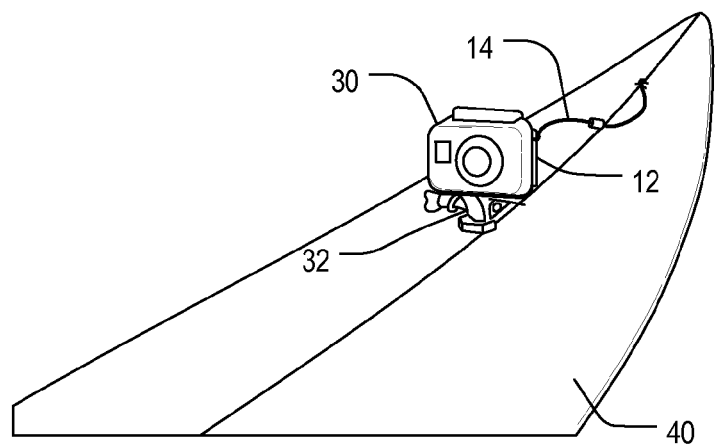
FIG. 8 is a perspective view of the camera, float attachment device, and surfboard of FIG. 7.

The float attachment device 10,110 is easy to implement. FIG. 7 is a fragmentary side schematic view of the camera 30 and float attachment device 10 of FIG. 3 attached to a surfboard 40, and FIG. 8 is a perspective view of the camera 30, float attachment device 10, and surfboard 40 of FIG. 7. As shown therein, the camera 30 is attached to the surfboard 40 using a mount 32. In at least some embodiments, the location at which the camera 30 is mounted is selected by the user. A camera mounting system suitable for use with various preferred embodiments of the present invention is available from Woodman Labs, Inc. and marketed under the name GO PRO®. The buoyant body 12 is mounted to the back of the camera housing 30 or other object of interest as described previously. One lanyard section 20 is attached to the buoyant body 12, the other lanyard section 22 is attached to the anchor body 40, and the two sections 20,22 are connected together via the clip or other device 18. In at least some embodiments, the location at which the second lanyard section 22 is attached to the anchor body 40 is selected by the user.

With the various elements in place as so described, the float attachment device 10 provides two measures of protection for the camera 30 should it become dislodged from its location on the surfboard 40 or other location and falls into the water. First, the buoyant body 12 mounted on the back of the camera housing 30 keeps the camera housing 30 afloat in the water, making it possible for it to be located and retrieved with relatively minimal effort. Second, the lanyard 14 prevents the camera housing 30 from becoming separated from the anchor body 40, which in this case is the surfboard. (Even if the lanyard 14 breaks, the camera 30 will still remain floating.) Thus, when the user is participating in his or her desired watersports activity, such as surfing, the user may choose to use the camera 30 to take photos or shoot video. If the surfer or other user crashes, and the camera mount 32 fails or is ripped from the board 40 (an occurrence that happens relatively frequently), the camera 30 may fall into the water, but it will float, and it will not float very far away from the surfboard 40, thus making it easy to find and retrieve the camera 30.

Figure 9:
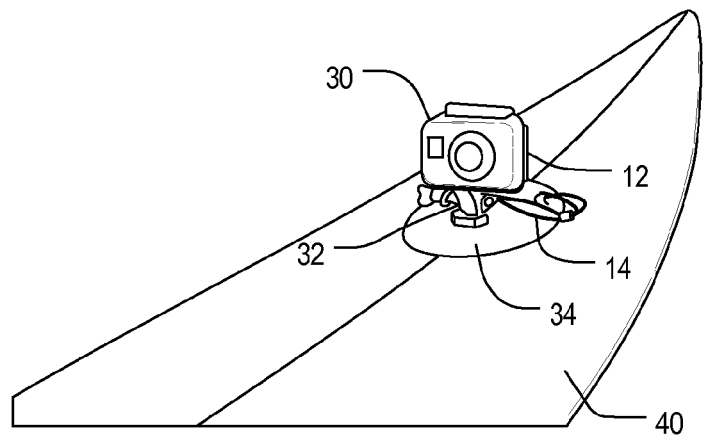
FIG. 9 is a perspective view of another float attachment device mounted on a waterproof camera in accordance with one or more preferred embodiments of the present invention.

FIG. 9 is a perspective view of another float attachment device 10 mounted on a waterproof camera 30 in accordance with one or more preferred embodiments of the present invention. In this arrangement, the camera housing 30 is mounted using a special platform mount 34, and one end of the lanyard 14 is attached to the platform mount 34 (i.e., the platform mount 34 serves as the anchor body). The remainder of the float attachment device 10 is similar to that described previously. In this arrangement, if the camera housing 30 separates from the platform mount 34, it will float, and it will not float very far away from the surfboard 40. One advantage of this arrangement is that the lanyard 14 does not have to be separately attached to the surfboard itself, thus preserving the integrity of the board.

Figure 10:
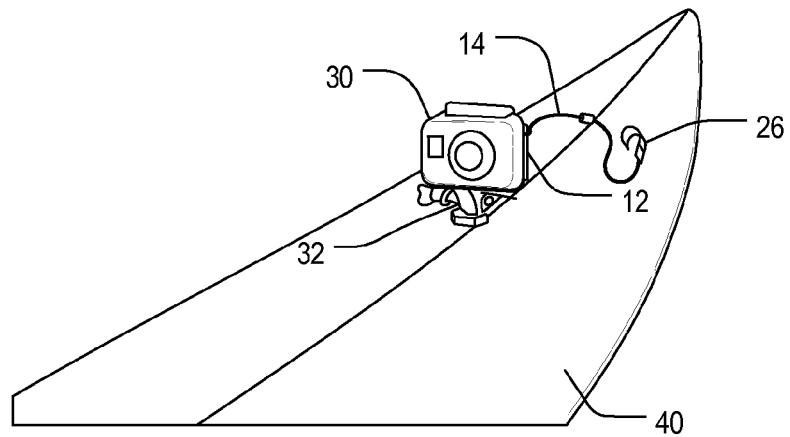
FIG. 10 is a perspective view of another float attachment device mounted on a waterproof camera in accordance with one or more preferred embodiments of the present invention.

FIG. 10 is a perspective view of another float attachment device 10 mounted on a waterproof camera 30 in accordance with one or more preferred embodiments of the present invention. In this arrangement, the lanyard 14 further includes, or is supplemented with, a cuff 26 by which the lanyard 14 may be attached to the wrist or ankle of a user (i.e., the user serves as the anchor body). The remainder of the float attachment device 10 is similar to that described previously. In this arrangement, if the camera housing 30 separates from its mount 32 or from the surfboard or the like, it will float, and it will not float very far away from the user. As with the arrangement shown in FIG. 9, one advantage of this arrangement is that the lanyard 14 does not have to be separately attached to the surfboard itself, thus preserving the integrity of the board. Furthermore, this arrangement allows the user to focus only on regaining control of the surfboard, because the camera 30 itself remains tethered to his or her wrist or ankle.

Figure 11:
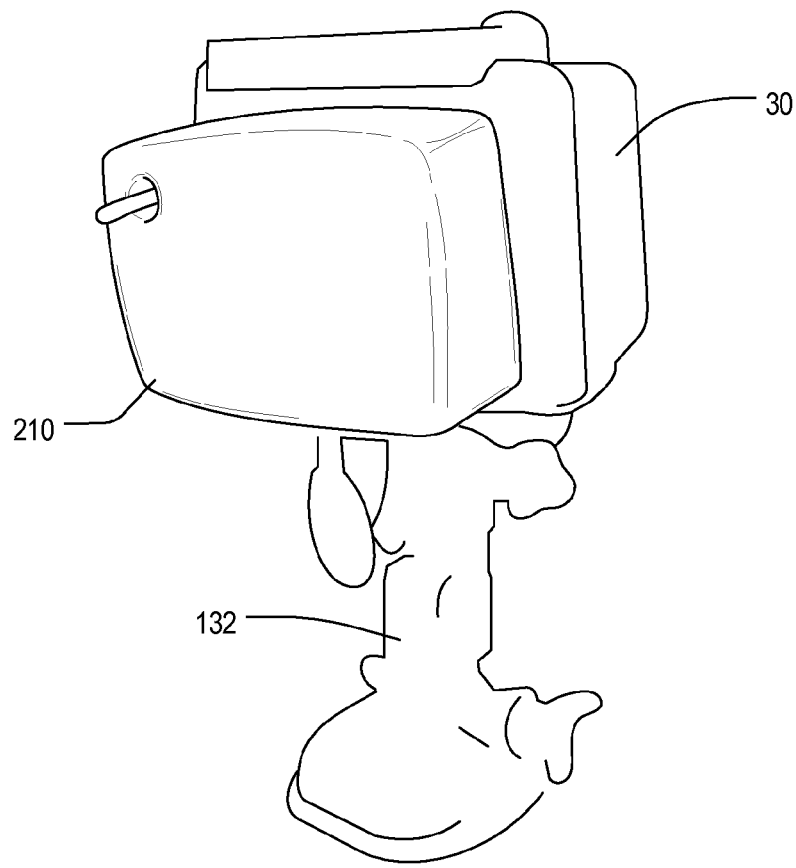
FIG. 11 is a perspective view of a commercial implementation of a float attachment device in accordance with one or more preferred embodiments of the present invention.

FIG. 11 is a perspective view of a commercial implementation of a float attachment device 210 in accordance with one or more preferred embodiments of the present invention.

Optionally, the same float attachment device 10 may be utilized in a different manner. Rather than attaching the buoyant body 12 to the camera or other object of interest 30, the buoyant body may be attached to, or even merely rested upon, the surfboard or other anchor body 40, with the lanyard being connected between the buoyant body 12 and the object of interest 30. In this arrangement, although the buoyant body 12 will not itself provide buoyancy directly to the object of interest 30, it still serves as a tether between the object 30 and the anchor body 40 (when attached to the anchor body 40), or as a "buoy," floating on top of the water while the object 30 dangles below (when not attached to any anchor body 40). It will be appreciated that although this may not be the preferred manner of usage, it is still an alternative mode of operation provided by the elements of the present invention. The double-sided tape 24 may be used to attach the camera or other object 30 to the surfboard or other anchor body 40.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A float attachment device for providing buoyancy to a waterproof camera, comprising:
   (a) a buoyant body fastened directly to a housing of the waterproof camera via double sided tape; and
   (b) a lanyard connected at a first end to the buoyant body and at a second end to a surfboard, the lanyard including
      (i) a first section of tether line connected to the buoyant body, and
      (ii) a second section of tether line connected to the surfboard,
      (iii) wherein the first section of tether line may be connected and disconnected from the second section of tether line without removing the first section from the buoyant body or the second section from the surfboard, thereby allowing the buoyant body to be temporarily removed from the presence of the surfboard;

(c) wherein the buoyant body includes a hole penetrating therethrough, and wherein the lanyard is routed through the opening to couple the lanyard to the buoyant body.

2. The float attachment device of claim 1, wherein the buoyant body is a block of closed cell flotation foam.

3. The float attachment device of claim 2, wherein the block of closed cell flotation foam has a first dimension between 1.0 and 4.0 inches, a second dimension between 1.0 and 3.0 inches, and a third dimension between 0.5 and 1.5 inches.

4. The float attachment device of claim 1, wherein the buoyant body has a flexible vinyl coating.

5. The float attachment device of claim 1, wherein the buoyant body is comprised of flotation foam.

6. The float attachment device of claim 5, wherein the flotation foam is closed cell flotation foam.

7. The float attachment device of claim 5, wherein the flotation foam is covered by a flexible vinyl coating.

8. The float attachment device of claim 5, wherein the dimensions of the flotation foam are selected to correspond to the dimensions of the object of interest.

9. The float attachment device of claim 2, wherein the block of closed cell flotation foam has a first dimension between 1.0 and 4.0 inches, a second dimension between 1.0 and 3.0 inches, and a third dimension between 0.5 and 1.5 inches.

10. The float attachment device of claim 1, wherein the buoyant body has a buoyancy sufficient to support at least the weight of the object of interest.

11. The float attachment device of claim 10, wherein the buoyant body has a buoyancy sufficient to support at least three times the weight of the object of interest.

12. A float attachment device for providing buoyancy to a waterproof camera, comprising:
   (a) a buoyant body;
   (b) an attachment layer fastening the buoyant body directly to the waterproof camera; and
   (c) a lanyard connected at a first end to the buoyant body and connected at a second end to a surfboard, the lanyard including
      (i) a first section of tether line connected to the buoyant body, and
      (ii) a second section of tether line connected to the surfboard,
      (iii) wherein the first section of tether line may be connected and disconnected from the second section of tether line without removing the first section from the buoyant body or the second section from the surfboard, thereby allowing the buoyant body to be temporarily removed from the presence of the surfboard;
   (c) wherein the buoyant body includes a hole penetrating therethrough, and wherein the lanyard is routed through the opening to couple the lanyard to the buoyant body.

* * * * *